(12) United States Patent
Pridoehl et al.

(10) Patent No.: US 9,283,714 B2
(45) Date of Patent: Mar. 15, 2016

(54) MULTICOLORED FUSED DEPOSITION MODELLING PRINT

(75) Inventors: Markus Pridoehl, Grosskrotzenburg (DE); Guenter Schmitt, Darmstadt (DE); Dirk Poppe, Frankfurt am Main (DE); Stephan Kohlstruk, Duelmen (DE); Benjamin Hammann, Frankfurt (DE); Sonja Cremer, Sulzbach (DE); Kris Beks, Rosmeer (BE); Ludo Dewaelheyns, Zutendaal (BE)

(73) Assignee: Evonik Röhm GmbH, Darmstadt (DE)

( * ) Notice: Subject to any disclaimer, the term of this patent is extended or adjusted under 35 U.S.C. 154(b) by 12 days.

(21) Appl. No.: 14/116,244

(22) PCT Filed: Apr. 3, 2012

(86) PCT No.: PCT/EP2012/056010
§ 371 (c)(1),
(2), (4) Date: Nov. 7, 2013

(87) PCT Pub. No.: WO2012/152511
PCT Pub. Date: Nov. 15, 2012

(65) Prior Publication Data
US 2014/0079841 A1    Mar. 20, 2014

(30) Foreign Application Priority Data

May 10, 2011  (DE) .......................... 10 2011 075 544

(51) Int. Cl.
*B29C 67/00* (2006.01)
*B29B 7/94* (2006.01)
(52) U.S. Cl.
CPC ............... *B29C 67/0055* (2013.01); *B29B 7/94* (2013.01)

(58) Field of Classification Search
CPC .............................. B29C 67/0055; B29B 7/94
USPC ......................................................... 425/375
See application file for complete search history.

(56) References Cited

U.S. PATENT DOCUMENTS

| 5,236,645 | A | * | 8/1993 | Jones .............................. 264/78 |
| 6,004,124 | A | * | 12/1999 | Swanson et al. ............... 425/375 |
| 6,129,872 | A | * | 10/2000 | Jang ................................ 264/75 |
| 6,280,784 | B1 | * | 8/2001 | Yang et al. ..................... 426/231 |
| 2010/0327479 | A1 | | 12/2010 | Zinniel et al. |
| 2011/0076495 | A1 | | 3/2011 | Batchelder et al. |

OTHER PUBLICATIONS

U.S. Appl. No. 14/073,098, filed Nov. 6, 2013, Pridoehl, et al.
U.S. Appl. No. 14/116,515, filed Nov. 8, 2013, Pridoehl, et al.
International Search Report Issued Jul. 6, 2012 in PCT/EP12/056010 Filed Apr. 3, 2012.
U.S. Appl. No. 14/068,395, filed Oct. 31, 2013, Pridoehl, et al.

* cited by examiner

*Primary Examiner* — Joseph S Del Sole
*Assistant Examiner* — John Robitaille
(74) *Attorney, Agent, or Firm* — Oblon, McClelland, Maier & Neustadt, L.L.P.

(57) ABSTRACT

The invention relates to a modified fused deposition modeling process for production of multicolored three-dimensional objects. More particularly, the invention relates to a 3D printing process with which 3D objects with particularly good color appearance compared to the prior art can be produced. The process according to the invention is based on coloring of the polymer strand used for production of the actual object in the nozzle, and on using a mixing apparatus which comprises a plurality of injection needles, a static mixer or a dynamic mixer.

16 Claims, 2 Drawing Sheets

MULTICOLORED FUSED DEPOSITION MODELLING PRINT

FIELD OF THE INVENTION

Figure 1:
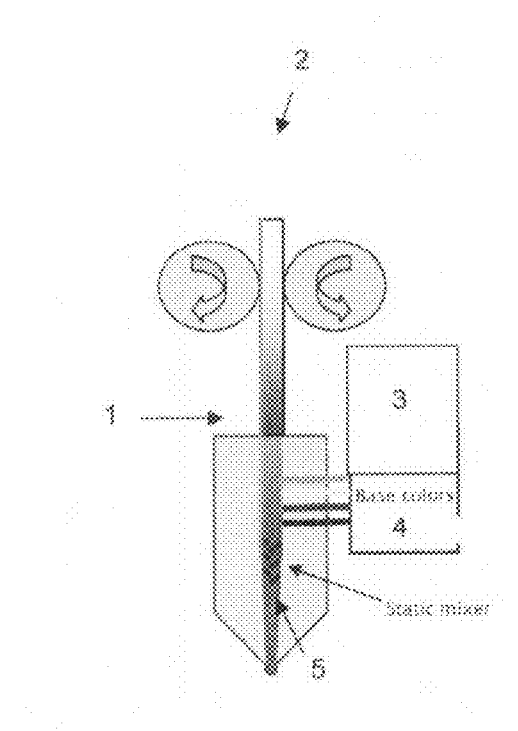

The invention relates to a modified fused deposition modeling process for producing multicolored three-dimensional objects. More particularly, the invention relates to a 3D printing process with which 3D objects with particularly good color appearance compared to the prior art can be produced. The process according to the invention is based on coloring of the polymer strand used for production of the actual object in the nozzle, and on using a mixing apparatus which comprises a plurality of injection needles, a static mixer or a dynamic mixer.

PRIOR ART

Rapid prototyping or rapid manufacturing processes are manufacturing processes which have the aim of converting available three-dimensional CAD data, as far as possible without extra manual operations or forming, directly and rapidly to workpieces.

Among the rapid-prototyping processes, there are now various processes. These can be divided into two groups: laser-based processes and processes without use of a laser.

The best-known laser-based and simultaneously the oldest 3D printing process is stereolithography (SLA). This involves curing a liquid composition of a radiation-curable polymer layer by layer with a laser. It is clearly evident to the person skilled in the art that a workpiece produced in this way can only be colored subsequently on the surface. This is inconvenient and time-consuming.

Similarly, the selective laser sintering process (SLS), in which a pulverulent raw material, for example a thermoplastic or a sinterable metal, is selectively sintered layer by layer by means of a laser, analogously to SLA. This process too can give only single-color or unspecifically colored 3D objects in the first process step. The same applies to the third laser-based process, "laminated object manufacturing", in which a paper web or a polymer film provided with adhesive is bonded layer by layer and cut by means of a laser. The subsequent coloring of an object is described, for example, in U.S. Pat. No. 6,713,125.

A known 3D printing process which can also be used for production of multicolored objects is the UV inkjet process. In this three-stage process, a pulverulent material is applied in thin layers, a UV-curable liquid is printed onto these in the form of the respective layer of the later three-dimensional product, and the printed layer is finally cured with a UV source. These process steps are repeated layer by layer.

In EP 1 475 220, variously colored liquids comprising hardener are kept ready, and, in WO 2008/077850, additionally mixed in a chamber directly prior to printing. Thus, selective coloring is possible. However, the mixing chambers do not enable sharp color transitions. Moreover, such a process is unsharp at the limits of curing, which can lead to a less smooth surface and, under some circumstances, to inhomogeneous color. WO 01/26023 describes two print heads with different-colored hardener compositions which lead to object parts with different elasticity properties. However, no more than two colors are described.

A variant in which curing is effected with thermal radiation rather than with UV light and variously colored hardener compositions are likewise used is described in WO 2008/075450.

GB 2419679 discloses a process in which variously colored polymer particles can be selectively applied and cured at various wavelengths. This process is extremely complex and, at the same time, leads to an unsharp color appearance.

In a process similar to inkjet 3D printing, according to WO 2009/139395, a colored liquid is applied layer by layer and printed selectively with a second liquid which leads to a curing reaction with the first liquid. Such a process can build up colors only layer by layer, not to mention the fact that mixing may occur between the uncured liquid layers.

A further process is three-dimensional printing (TDP). In this process, analogously to the inkjet processes, pulverulent materials, which, however, are preferably ceramics, are selectively saturated layer by layer with a the melt of a thermoplastic polymer. After each print layer, a new layer of the pulverulent material has to be applied. On solidification of the thermoplastic, the three-dimensional object is formed.

In the process described in US 2004/0251574, the printing of the thermoplastic is followed by selective printing with a color ink. The advantage of this process is that very selective printing is possible. However, the disadvantage of this process is that it is not possible to achieve a homogeneous and luminous color appearance, since homogeneous penetration of the color ink into the composite composed of the (ceramic) powder and the binder cannot be achieved.

In the process described in EP 1 491 322, two different materials are printed. The first contains the binder and a color ink, which is precipitated on contact with the second material and hence selectively colors the surface. In this way, better color properties at the object surface can be obtained. Problems are presented, however, by the homogeneous mixing of the two materials and the complex two-stage operation. How and whether a good color appearance can be achieved in the case of multicolor printing is not described.

In U.S. Pat. No. 6,401,002, various liquids comprising different color inks and the binder are used. These liquids are either applied dropwise separately or combined via lines in a nozzle prior to dropwise application. The person skilled in the art is aware that neither method leads to optimal color appearances. In the case of the former method, the mixing of the color inks takes place in viscous liquids on the surface. This mixing is thus rarely complete. In the case of the second method, pressure differences in the lines may lead to very significant color variations.

The most material-sparing process with regard to the production of three-dimensional objects by means of a printing process, which is also the most favorable in relation to machine configuration, is fused deposition modeling (FDM). This process, with minor modifications, is also called selective deposition modeling (SDM).

In the FDM method, two different polymer filaments are melted in a die and printed selectively. One material is a support material which is required only at points where, for example, an overhanging part of the 3D object which has to be supported during the printing operation is printed at a later stage. This support material can be removed at a later stage, for example by dissolution in acids, bases or water. The other material (the build material) forms the actual 3D object. Here too, the printing is generally affected layer by layer. The FDM process was described for the first time in U.S. Pat. No. 5,121,329. Coloring in general is mentioned in US 2002/0111707, but is not described in any great detail.

In the process described in EP 1 558 440, the individual layers are printed in color in a subsequent process step. This process is slow and leads, in the course of printing of the already curing thermoplastics, to poorly resolved color appearances.

In the color 3D print method according to U.S. Pat. No. 6,165,406, separate nozzles are used for each individual color ink. However, mixed colors are thus possible only to a very limited degree, and the color appearance becomes very simple.

In the variant of FDM described in U.S. Pat. No. 7,648,664, variously colored build materials in granule form are used, melted separately from one another and mixed with one another according to the color by means of an intermediate extruder, before they are printed. This method is very complex in apparatus terms, and many advantages of FDM are lost.

In a very similar system according to EP 1 432 566, the molten granules are mixed directly in the heated print head before being printed directly. This mixing can in no way be complete, and the quality of the printed image is correspondingly poor. Furthermore, there is also the disadvantage here that granules or powders have to be used, and these have to be stored and melted separately in the machine.

U.S. Pat. No. 6,129,872 describes a process in which the build material is melted in a nozzle and, at the end of the nozzle, various color mixtures are selectively metered into the melt. However, this does not lead to adequate mixing and leads to a distorted color appearance.

PROBLEM

The problem addressed was that of providing a 3D printing process with which selectively colored, multicolored three-dimensional objects can be produced with a sharp and clear color appearance.

A further problem addressed was that of providing a favorable and rapidly performable 3D printing process for printing of multicolored objects.

A further problem addressed was that of being able to produce colored objects, without introducing the color only through an additional processing step.

Further problems which are not stated explicitly are evident from the overall context of the description, claims and examples which follow.

SOLUTION

The term "print head" in the context of this invention is understood to mean the entire apparatus for conveying, melting, coloring and applying a filament in an FDM 3D printing process.

The term "composition" in the context of this invention is understood to mean the composition which is used for coloring and/or additizing the polymer strand in accordance with the invention. The composition comprises color inks, pigments and/or additives.

The term "filament" in the context of the present invention is understood to mean the raw form of the build and support materials in the form of a strand. This filament is melted in the print head in accordance with the invention and then printed to give a 3D object. The filament is a thermoplastically processable material. In general, the filament is a polymer filament, but is not restricted to these. It is also possible for polymer filaments to be composed, for example, only partly of a thermoplastically polymeric matrix material and further fillers or, for example, metals.

The problems were solved by provision of a novel apparatus for production of single- or multicolored, three-dimensional objects from filaments. More particularly, this is an apparatus which works by the fused deposition modeling (FDM) process. According to the invention, this apparatus has at least one first print head with which a support material is printed, and a second print head with which a build material is printed, which is added in the form of a filament. This second print head has a nozzle, again consisting of at least two regions. The polymer is in solid form in the first, upper region of the nozzle, and the polymer is in molten form in the second, lower region. The transition between the solid state in the upper region and the molten state in the lower region within the print head is continuous.

More particularly, the inventive apparatus is characterized in that the second print head is supplied with additives and/or color inks from a plurality of reservoir vessels, equipped with metering apparatuses, and in that the second print head has a mixing apparatus for mixing these additives and/or color inks.

With regard to this mixing apparatus, various embodiments are conceivable. In a first embodiment, the apparatus is characterized in that the mixing apparatus is a static mixer in said lower region of the nozzle, and in that the color inks and/or additives from the reservoir vessels are metered into the melt above the static mixer. In this embodiment, the color inks supplied in each case are mixed simultaneously with the mixing of the latter with the polymer melt, to give a homogeneously colored and/or additized polymer melt.

In a second embodiment, the mixing apparatus is a dynamic mixer mounted on the outside of the print head. This dynamic mixer is at first supplied with various additives and/or color inks. The mixture produced in the dynamic mixer is then passed onward into the print head.

This second embodiment may have two different variants. In a first variant, the dynamic mixer is mounted on the nozzle such that the mixture is passed into the polymer melt in the lower region of the nozzle.

In a second variant, the dynamic mixer is mounted on the print head above the nozzle, and the mixture of color inks and/or additives is applied to the surface of the solid filament. The mixture may be distributed in this case partly through diffusion into the melt. Furthermore, homogeneous distribution in the melt is not absolutely necessary, since the later surface of the three-dimensional object is formed exclusively by the surface of the melt strand. With this variant, it is thus especially possible to provide a process which can be used with relatively low color ink consumption. The same also applies to additives, in particular those which are to bring about an improvement in adhesion between the individual layers in the three-dimensional object. These are required exclusively at the surface of the melt strand.

In a third embodiment, a combination of the first two embodiments is conceivable. In this embodiment, the print head has, in addition to the dynamic mixer according to the second embodiment, a static mixer according to the first embodiment in the lower region of the nozzle.

A fourth embodiment is characterized in that the additives and/or color inks are injected into the melt in said lower region of the nozzle, metered and distributed by means of micro-injection nozzles, preferably in a pulsating manner, in micro-injection nozzles which cut into the melt at an angle of $\leq 90°$. Said angle is the angle which is formed between the micro-injection nozzles and the filament or the melt formed therefrom in transport direction of the filament. By virtue of this angle being less than 90°, a transport effect of the filament or of the melt is additionally achieved. With the frequency used in this embodiment, it is especially possible to control the distribution and/or concentration of the respective color component. The number of needles is apparent to the person skilled in the art, more particularly from the choice of color system selected.

The color inks used in the apparatus are compositions of various color inks, for example three primary color inks, for example the subtractive mixture of magenta, cyan and blue or yellow, or the additive mixture of red, green and blue, the constituent colors of light. When three primary color inks are used, black may preferably be used in addition as a fourth "color ink". Alternatively, depending on the build material, it is also possible to use white as a fourth or fifth "color ink". For true-color systems, however, up to twenty color inks may even be required according to the system.

The color systems of different compositions which have been detailed have already long been known to those skilled in the art from 2D printing. Each of the color inks used is present in separate reservoir vessels, each equipped with a dedicated metering apparatus, and are metered therefrom into the nozzle or the dynamic mixer according to the embodiment.

In a particular embodiment, the apparatus for producing three-dimensional bodies has a third print head. This optional third print head is equipped in exactly the same way as the second print head. More particularly, by means of this third print head, a filament for a second build material is printed, this differing from the first build material.

For example, the second print head may contain a non-transparent build material uncolored prior to the coloring operation, and the third print head a transparent build material uncolored prior to the coloring operation. Preferably, both of these print heads each have dedicated mixing apparatuses which draw on the same reservoir vessel. The color compositions may optionally also comprise fillers which impart a non-transparent appearance if required to the transparent build material in the printing operation.

Preferably, the build materials are each thermoplastic materials. Preferably, the build material from the second and/ or the third optional print head comprises acrylonitrile-butadiene-styrene terpolymer (ABS), polycarbonate (PC), poly (meth)acrylate, polyphenylene sulfone (PPSU), HDPE, polyetherimide (PEI), polyetheretherketone (PEEK), polylactic acid (PLA) or a mixture of at least two of these polymers, or a mixture composed to an extent of at least 50% by weight of one of these said polymers. The notation "(meth) acrylate" here means both methacrylate, for example methyl methacrylate, ethyl methacrylate etc., and acrylates, for example ethylhexyl acrylate, ethyl acrylate etc., and mixtures of the two.

With regard to the second, optional build material from the third nozzle, preference is given particularly to polymethacrylate or polycarbonate.

With regard to the support material from the first print head, this should preferably be an acid-, base- or water-soluble polymer.

The inventive apparatus for use in a fused deposition modeling (FDM) process corresponds generally to the prior art and is thus generally configured such that the respective hue is input into a computer-based CAD program that provides a file which, in addition to the coordinates, contains the color information for manufacture and for regulation of the material and color settings. By regulation of the metering apparatuses and controlled metering of the respective primary color inks and black from the reservoir vessels, the respective hue is established.

Optionally, the second and third print heads of the apparatus may have further reservoir vessels which, in addition to black and the color inks or primary color inks, contain further pigments. These further pigments may, for example, be metallic pigments and/or fluorescent pigments.

As already stated, the reservoir vessels may also comprise additives. In this case, the compositions may comprise additives activatable by microwaves, heat, UV light or magnetic fields, adhesion promoters or adhesives. These may be added either to one or to all compositions, or be added from separate reservoir vessels. In the latter case, these compositions are colorless.

Alternatively or additionally, the additives may also be further additives for improving the tactile properties, soil-repellent or scratch resistance-improving coating constituents, or additives for surface stabilization, for example UV stabilizers. For industrial applications, additives for improving the thermal conductivity or electrical conductivity or antistats are additionally of interest.

The specific selection of the corresponding additives will be apparent to the person skilled in the art from the composition and the build material used.

In addition, one or more reservoir vessels may also contain crosslinkers, initiators or accelerators, which lead to crosslinking after mixing with the filament material from print head 2 and/or 3, such that a fully or partly elastomeric or thermoset three-dimensional object is obtained. When these additives encounter the thermoplastic of the filament there is a chemical reaction which leads to curing of the matrix.

Alternatively, the additives from different reservoir vessels may themselves react with one another after mixing and thus lead, for example, to chemical crosslinking at the filament surface and/or to an improvement in adhesion of the filaments to one another after printing.

Typically, the reservoir vessels are movable cartridges, as known for color printing from the prior art for 2-D inkjet color printers. These may be configured such that they can be exchanged or renewed easily and individually.

Figure 2:
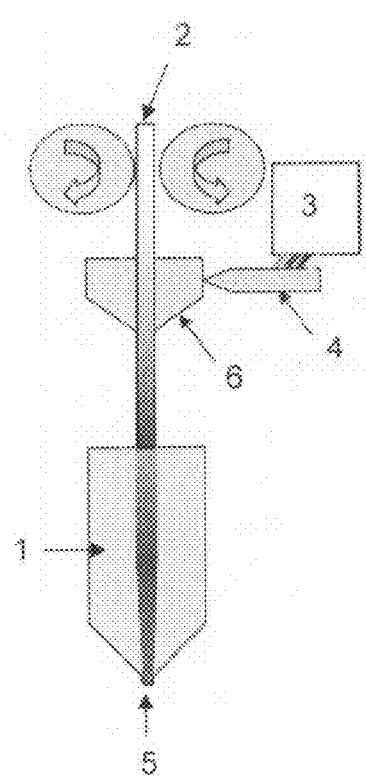
Figure 3:
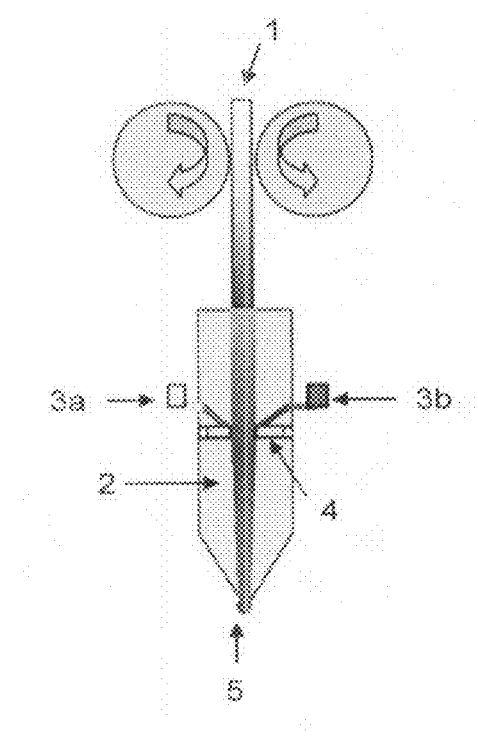

The drawings:

FIG. 1 depicts, by way of example, an embodiment in which the individual color inks are metered separately into the build material to be melted and then mixed with the melt of the build material by means of a static mixer. The following indices are present in the drawing:

1: Nozzle
2: Filament
3: Reservoir vessel (only one shown here by way of example)
4: Static mixer
5: Melt of the build material FIG. 2 depicts, by way of example, an embodiment in which the unmolten filament is surface coated and the color ink and/or additive composition is previously mixed homogeneously in a dynamic mixer. The following indices are present in the drawing:

1: Nozzle
2: Filament
3: Reservoir vessel (only one shown here by way of example)
4: Dynamic mixer
5: Melt of the build material
6: Coating unit FIG. 3 depicts, by way of example, an embodiment in which the color inks are introduced by means of pulsating micro-needles into the melt, or more specifically into the melting strand of the build material. The following indices are present in the drawing:

1: Filament
2: Nozzle
3*a*: Reservoir vessel 1
3*b*: Reservoir vessel 2
(only two reservoir vessels shown here by way of example)
4: Injection needles
5: Melt of the build material

The invention claimed is:

1. An apparatus for producing a single colored or a multicolored three dimensional article from a polymer filament, comprising:
   a first print head with which a support material is printed, and
   a second print head with which a build material is printed, wherein the build material is the polymer filament,
   wherein the second print head comprises a second nozzle comprising at least two regions, wherein the second nozzle has a downstream open end for printing the build material and forming a three dimensional article,
   wherein the second nozzle is configured such that the polymer filament is solid in an upper region of the second nozzle and molten in a lower region,
   wherein the second print head is connected to a supply source for at least one of an additive and a color ink, wherein the supply source includes a plurality of reservoir vessels, each equipped with a metering apparatus, and
   wherein the second print head further comprises a melter in the lower region of the second nozzle to melt the polymer filament and a mixing apparatus for mixing at least one of the melted polymer filament, the additive and the color ink, and
   wherein said second print head, said second nozzle is the single nozzle and the polymer filament is the single polymer filament, and the second print head comprises a plurality of micro-injection needles oriented to cut into the molten polymer filament.

2. The apparatus of claim 1, wherein the mixing apparatus is a static mixer in the lower region of the second nozzle, and the color inks from the reservoir vessels are metered into a melt above the static mixer.

3. The apparatus of claim 1, wherein the dynamic mixer has been mounted in the second nozzle, and the mixture is passed to the filament in the upper region of the second nozzle or into a polymer melt in the lower region of the nozzle.

4. The apparatus of claim 1, wherein the dynamic mixer has been mounted in the print head above the second nozzle, and the mixture is applied to a surface of the filament.

5. The apparatus of claim 1, wherein the second print head comprises, in addition to the dynamic mixer, a static mixer in the lower region of the nozzle.

6. The apparatus of claim 1, wherein the second print head further comprises separate reservoir vessels for color inks of at least three primary color inks and black ink, and each reservoir vessel is equipped with a metering apparatus.

7. The apparatus of claim 1, further comprising a third print head which is equipped in exactly the same way as the second print head, and has a filament for a second build material.

8. The apparatus of claim 7, wherein the second and third print heads each with dedicated mixing apparatuses draw on the same reservoir vessel.

9. The apparatus of claim 6, further comprising further reservoir vessels which, in addition to black and primary colors, comprise further color inks.

10. The apparatus of claim 1, wherein the second print head further comprises an adhesion promoter reservoir vessel or an adhesive reservoir vessel.

11. The apparatus of claim 1, wherein the print head further comprises a channel connecting the supply source to the bore of the nozzle.

12. The apparatus of claim 1, wherein the first print head comprises a first nozzle and the first nozzle is the single nozzle of the first print head.

13. The apparatus of claim 1, wherein the plurality of micro-injection needles are oriented to cut into the molten polymer filament at an angle of 90°.

14. The apparatus of claim 13, wherein micro-injection nozzles are connected to the supply source.

15. The apparatus of claim 1, wherein the plurality of micro-injection needles are oriented to cut into the molten polymer filament at an angle of less than 90°.

16. The apparatus of claim 1, wherein the melter is a heater.

* * * * *